455-601 AU 233 EX
FIP8106 XR 4,166,946

United States Patent [19]
Chown et al.

[11] 4,166,946
[45] Sep. 4, 1979

[54] DATA TRANSMISSION SYSTEM

[75] Inventors: Martin Chown, Harlow; Jeffrey G. Farrington, Bishops Stortford, England

[73] Assignee: International Standard Electric Corporation, New York, N.Y.

[21] Appl. No.: 804,686

[22] Filed: Jun. 8, 1977

[30] Foreign Application Priority Data
Jun. 29, 1976 [GB] United Kingdom ............... 27029/76

[51] Int. Cl.² .......................... G02B 5/14; H04B 9/00
[52] U.S. Cl. ................................. 250/199; 350/96.16
[58] Field of Search ..................... 358/901; 250/199; 350/96 R, 96.15, 96.16; 179/15 FE, 15 AL

[56] References Cited
U.S. PATENT DOCUMENTS

| 3,891,804 | 6/1978 | Hachenbarg | 179/15 AL |
| 4,072,399 | 2/1978 | Love | 250/199 |
| 4,074,127 | 2/1978 | Mochida | 250/199 |

OTHER PUBLICATIONS

M. Hudson, et al., "The Star Coupler", Applied Optics, 11-74, pp. 2540-2545, vol. 13, No. 11.

Primary Examiner—Robert L. Griffin
Assistant Examiner—Edward L. Coles
Attorney, Agent, or Firm—John T. O'Halloran; Peter C. Van Der Sluys

[57] ABSTRACT

An optical fibre data transmission system in which some terminals at least act as repeaters for received data. Each terminal is allotted a specified transmission time. Terminals are provided with optical fibre by-pass arrangements in case a repeating terminal fails.

8 Claims, 6 Drawing Figures

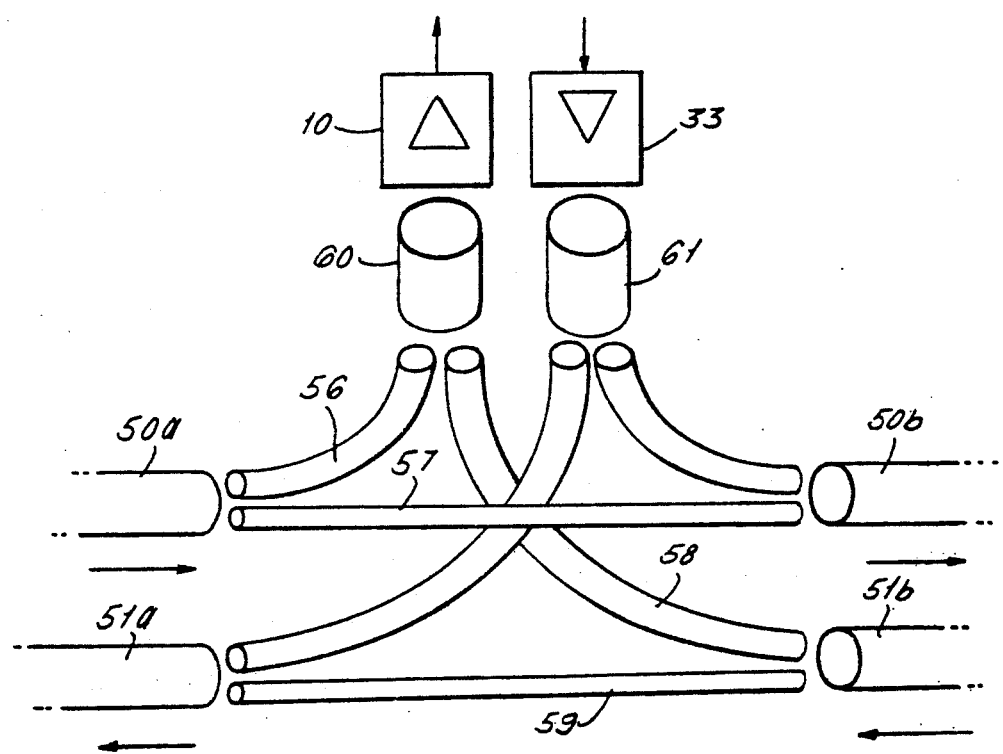

DATA TRANSMISSION SYSTEM

FIELD OF THE INVENTION

This invention relates to data transmission systems in which a plurality of data terminals are interconnected by optical fibre transmission links.

SUMMARY OF THE INVENTION

According to the invention there is provided a data transmission system comprising a plurality of data terminals each having a receiving means and a transmitting means for receiving data signals from and transmitting data signals to optical fibre transmission links, each optical fibre link connecting the transmitting means of a given data terminal to the receiving means of the next data terminal in the system, each data terminal including means for coupling a portion of the optical power in the optical fibre input to the receiving means to the optical fibre output of the transmitting means.

In one embodiment of the invention some at least of the data terminals act as on-line repeaters, the portion of the optical power that by-passes each of said repeating terminals being a minor portion of the total power received at that terminal and in all other terminals the portion of the optical power that by-passes the terminal is a major portion.

BRIEF DESCRIPTION OF THE DRAWINGS

FIG. 6 is a perspective view of the terminal coupling and by-pass arrangements in the system of FIG. 5.

DESCRIPTION OF THE PREFERRED EMBODIMENT

Figure 1:
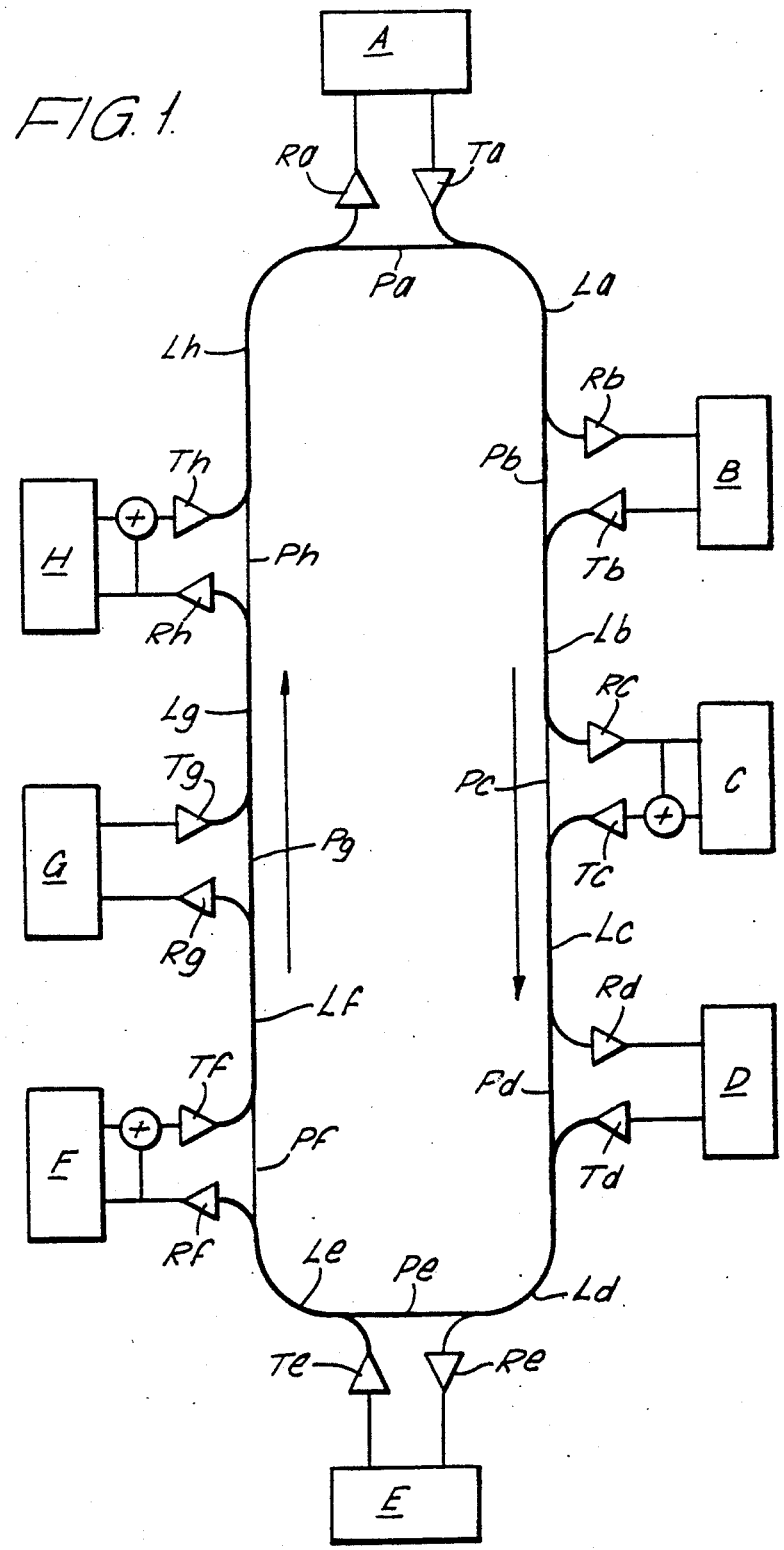
FIG. 1 is a block diagram of one form of data transmission system according to the invention.

In the system shown in FIG. 1 a number of data terminals A, B, C . . . are provided, each terminal having a receiving means Ra, Rb . . . and a transmitting means, Ta, Tb . . . . The transmission medium is an optical fibre. Each transmitting means is connected by an optical fibre link La, Lb . . . to the receiving means of the next terminal, thus the system forms what may be termed a "ring-main" system. In addition each terminal has an optical fibre by-pass Pa, Pb . . . connected from its input link to its output link. Terminals C, F and H are designed to act as on-line repeaters. In these the by-pass carries only a small proportion of the optical power, the greater portion going to the receiving means, e.g. Rc in the case of terminal C. The electrical output of RC is fed to both the data processing and control equipment DPC and to the transmitting mean TC. In the case of signals addressed to other terminals TC merely retransmits the signals received by Rc. There is of course some propagation delay in the repeater and this can be dealt with in one of two ways. Either the by-pass optical fibre is long enough (e.g. by being coiled) to introduce the same amount of delay or the attenuation of the by-pass signal is such that it is normally swamped by the repeated signal which is transmitted at much higher power level by Tc. The signals addressed to terminal C are recognised in DPC and the feed from Rc to Tc is inhibited during the occurence of such signals.

In the case of the non-repeating terminals A,B, D, E and G the major portion of the received optical power by-passes the terminal and only enough is diverted to the terminal to enable the receiving means to feed that terminals DPC. The power levels of the signals transmitted from each terminal and the frequency of the repeating terminals must be such that in the event of failure of one repeating terminal enough signal by-passes the failed terminal to allow the succeeding non-repeating terminals and the next repeating terminal to act properly. This may require some form of automatic gain control to be used. One form of automatic gain control gain (AGC) will be described below.

So far mention has been made only of repeated signals. Each terminal of course has the capability of originating signals for transmission. In the case of each terminal the signals for original transmission are not started until the allotted transmission time for that terminal. The terminal then transmits the stored signals via its transmitting means. Again, it is assumed that the transmitted power levels are sufficient high and the distribution of repeaters is sufficiently frequent to allow the original signals to swamp any by-pass signals at that time. It will be appreciated that the spacing of the terminals and the frequency of location of repeating terminals depends both on the attenuation characteristics of the optical fibre links, a factor which is related to the length of each link, and to the variation in gain afforded by AGC at each terminal.

Before describing the AGC arrangements and the terminals in detail it is necessary to consider the signal format of the system. For a system with n terminals the signals are propagated in successive frames of n channels each. Each channel is divided into 180 time slots which are allocated as follows:

| | |
|---|---|
| Preburst (to allow AGC and retiming to settle) | 30 |
| Address of Transmitter | 12 |
| Address of Receiver | 12 |
| Data | 120 |
| Inter-period blank | 6 |
| | 180 |

The preburst is utilised by the terminal receiver to determine the amount of AGC required. Thus in the case of terminal D it would normally require a minimum amount of gain since the signals received from the transmitter of C would be strong. However, if there was a failure at C then D would receive only the signals which by-passed C. These would be at a much lower amplitude and D would therefore set its receiver gain at a high level. The same procedures would occur at terminals E and F which would require successively higher levels of gain to function effectively. Note that the gain is set separately for each channel period. Thus, in the event of failure of terminal D, terminal F would set its gain high only when dealing with signals originating from terminals other than terminal E. Signals originating at terminal E would be received by F at normal strength.

Only one terminal is transmitting at any one time. Although each receiver will set its AGC at the start of every channel period only those terminals which are addressed will write the subsequent data into stores.

Figure 2:
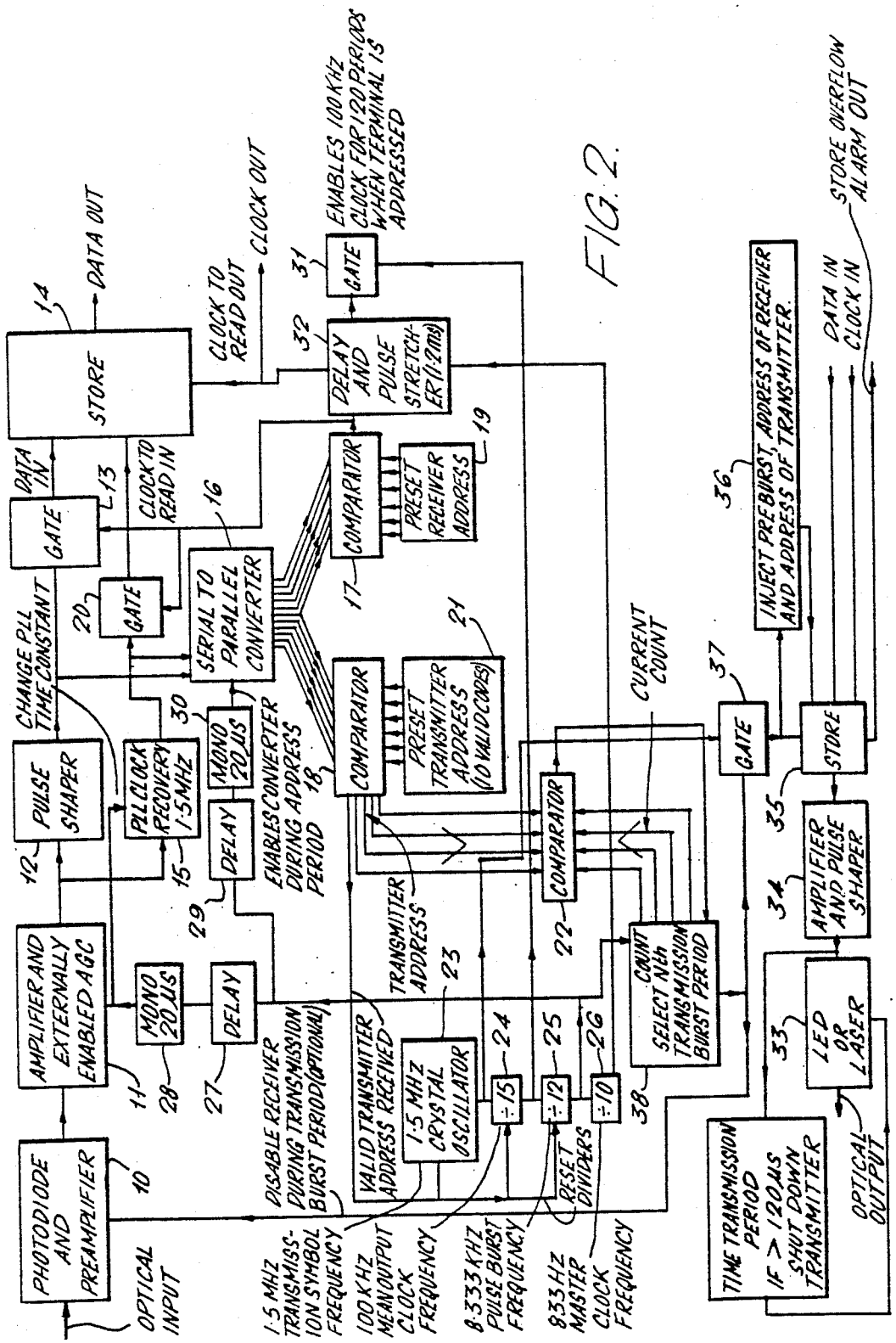
FIG. 2 is a block diagram of a non-repeating data terminal for use in the system of FIG. 1.

Details of a non-repeating terminal in a 10 terminal system are shown in FIG. 2. The incoming optical fibre is coupled to a photo-diode and pre-amplifier stage 10 the output of which goes to amplifiers 11. This incorporates the AGC control which is set externally by the preburst signal level. The amplifier output goes to a pulse shaping network 12 and from there via a gate 13 into a store 14. The amplifier output also goes to a phase locked loop clock recovery circuit 15 where a 1.5 MHz clock is derived, this being the transmission symbol rate of the incoming signals. This recovered clock is fed to a serial-to-parallel converter 16, together with the output of pulse shaping circuit 12. The parallel data is fed to two comparators 17 and 18. In comparator 17 the data is compared with the terminals own address code held in a preset address store 19. If the addresses match comparator 17 enables gates 13 and 20 which together allow the incoming data to be written into store 14. Comparator 18 compares the incoming signals with pre-set transmitter address codes held in store 21. The output of comparator 18 is used to synchronise a divider chain which provides the various clocks required in the terminal. This chain includes a crystal controlled oscillator 23, which provides a 1.5 MHz transmission symbol clock, followed by a divide-by-15 circuit 24 which gives the mean output clock frequency of 100 KHz, a divide-by-12 network 25 which gives the 8.333 KHz pulse burst frequency and a divide-by-10 network 26 which gives the 833 Hz master clock frequency. The pulse burst frequency of 8.333 KHz is fed via delay 27 and a monostable 28, which has a time constant of 20 us, to the amplifier 11 where it enables the AGC during the pre-burst period only. For the rest of the time the gain is clamped.

The output of monostable 28 is also used to alter the time constant of the phase locked loop 15, allowing it to lock rapidly during the pre-burst, and then changing it to a long time constant during the reception of the address codes and data. The 8.333 KHz frequency also goes via delay 29 and monostable 30, also with a 20 us time constant, to the serial-to-parallel converter 16 to control the feeding of the incoming address codes to the converter 16. The 100 Khz mean output clock frequency is fed via gate 31 to the store 14 where it controls read-out of the store contents. Gate 31 is enabled by the output of a delay and pulse stretcher circuit 32 which in turn is enabled by the output of the address comparator 17 and enables the gate 31 for 120 periods of 1.2 ms each when the terminal is addressed.

Transmission of data from the terminal is achieved by modulating a light emitting diode or laser 33, which is coupled to the outgoing optical fibre link. The light source 33 is driven via an amplifier and pulse shaper circuit 34 which receives the output from store 35. Store 35 receives the preburst and address codes from a code generating circuit 36. The data to be transmitted is fed in under the control of an independent input clock and facilitates are provided for indicating a store overflow condition. Operation of code generator 36 and reading out from the store 35 are accomplished under the control of the 1.5 MHz clock via gate 37 during the appropriate transmission burst period. The transmission burst period is determined by a switching logic circuit 38 which receives both the 8.33 KHz and 833 Hz clocks. This circuit selects the $N^{th}$ transmission burst period (in the case of the $N^{th}$ terminal) and enables gate 37 during this period to provide exactly 180 periods of 15 MHz clock during this period.

Simultaneously circuit 38 enables the photodiode and amplifier stage 10 so that as data is received by the terminal during each $N^{th}$ period it is replaced by fresh data originating at that terminal.

The current count in circuit 38, in the form of an address, is compared in comparator 22 with the address being received by comparator 18. If the two differ, indicating an error, the output of comparator 22 is used to update the count in circuit 38.

Only when the receiver is addressed during a master clock period will read-out clock be enabled for a series of 120 pulses. This means that when a terminal is receiving at less than 100 kbit/s, it will clock data out in bursts of 100 kbit/s (10 × 12 bit words), with some 1.2 ms blank periods. The terminal could be designed to allow the received data rate to be increased anywhere up to 0.9 Mbit/s. The clock frequency would be higher and the store larger, again with provision to enable bursts of 120 clock cycles every time the receiver is addressed. The limit is when all the other main nine terminals are addressing the same receiver.

It may be desirable to insert extra information into each message, to give confirmation of a parity correct message having been received in the last frame. This could take the form of an extra ten bit word inserted into each message sent. A suggested format would be one bit allocated to each transmitter, so that all zeros would mean that no messages were received in the last frame. A single one indicates a parity correct message, and its position in the word gives the transmitter it was received from. This would allow confirmation to be sent to all terminals in a single message, so allowing for the possibility of all 9 terminals sending to a single receiver. This is seen as an optional refinement that should not be necessary for the basic functioning of the system. Indeed, the insertion of this extra word could be left to the user equipment connected to each terminal.

It may be desirable to enable a receiver to receive certain types of message rather than messages sent specifically to it. This could be achieved by having the receiver address remotely programmable and using extra address codes as message labels indicating the type of information.

The use of a self clocking code (e.g. Bi-Phase) would simplify the operation of the system. Bi-Phase coding is arranged to have a constant DC component whatever the data being transmitted. This means that a simple level shifting network can be used to choose the switching threshold for the receiver. The code ensures that there is at least one transition of signal for each bit of data and so the time constants involved in level shifting can be short. This should eliminate the need for a "track and hold" AGC as described previously. A self clocking code should also eliminate the need for a Phase Locked Loop.

Figure 3:
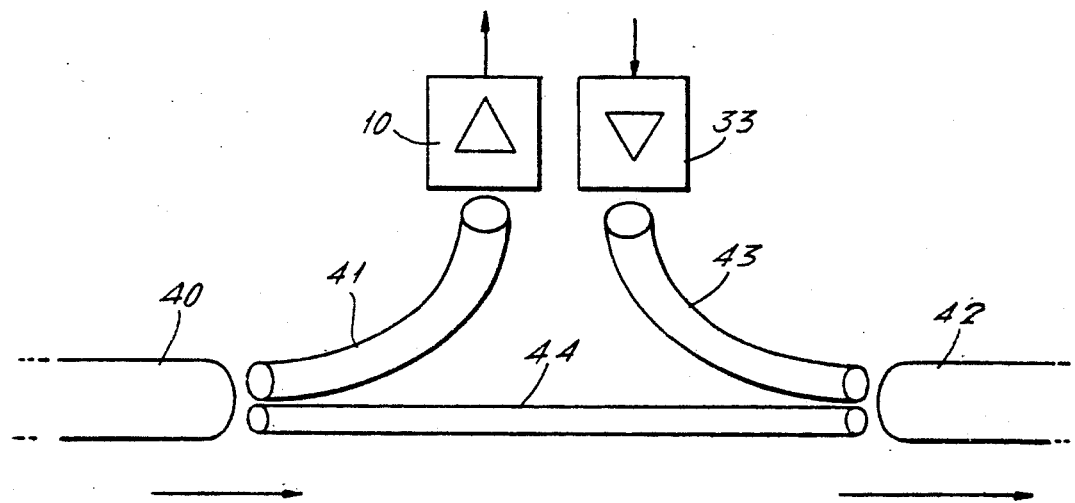
FIG. 3 is a perspective view of an optical fibre by-pass and coupling arrangement for a terminal in the system of FIG. 1.

The by pass arrangements referred to earlier are accomplished by the use of optical fibre-to-fibre couplings. For the basic unidirectional system shown schematically in FIG. 1 a coupling arrangement of the type shown in FIG. 3 is used. The incoming optical fibre link 40 is coupled to the receiver 10 by a short optical fibre coupling 41 and the outgoing link 42 is coupled to the transmitter 33 by a short coupling 43. The incoming link 40 is also coupled to the bypass fibre 44 which in turn is coupled to the outgoing link 42. In the case of a repeating terminal the couplings 41 and 43 are low loss lengths of optical fibre whilst the by pass fibre 44 is deliberately designed to have a considerable amount of attenuation. In the case of a non-repeating terminal the bypass fibre 44 is a low-loss fibre and most of the optical power in link 40 is coupled into the by-pass, only a small amount, sufficient only to enable the terminal to function, is coupled into coupling 41.

Figure 4:
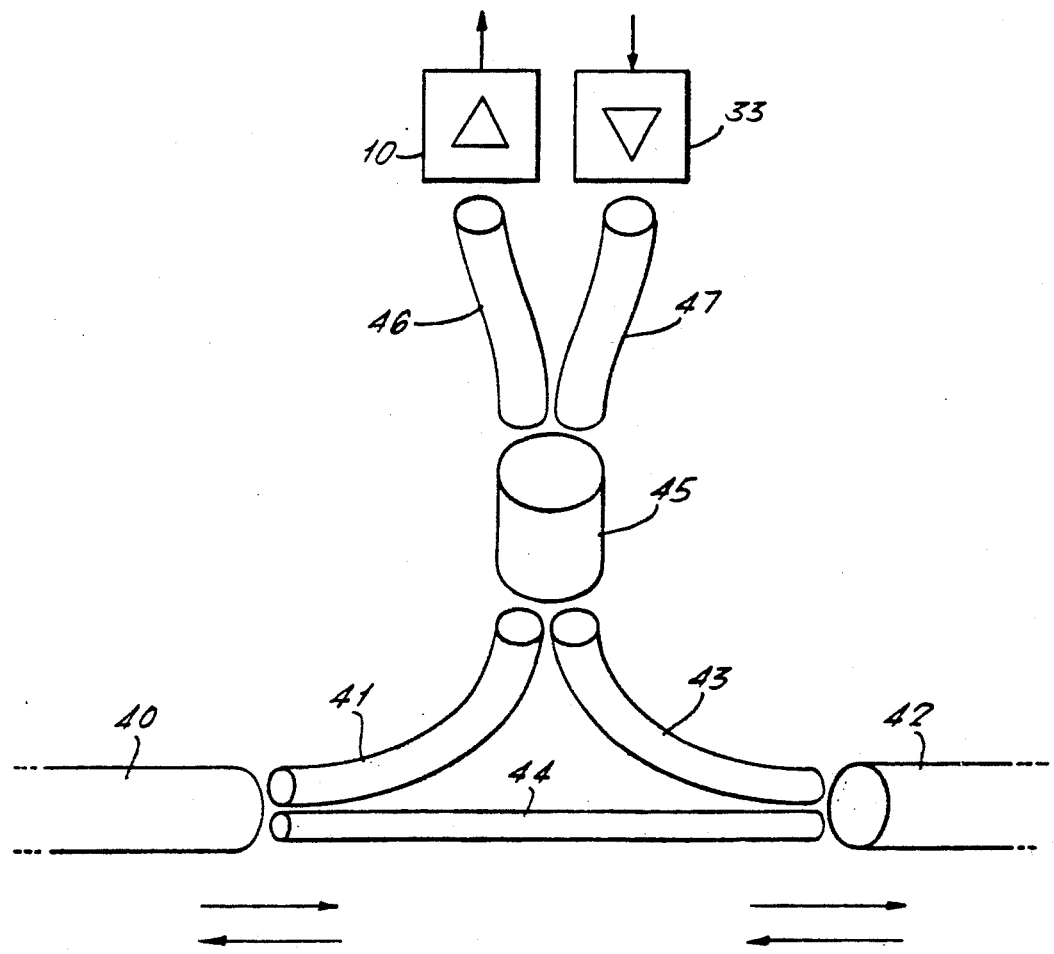
FIG. 4 is a perspective view of a terminal coupling and by-pass arrangements in a second form of data transmission utilising bi-directional optical fibre links.

Reference has so far been made only to a unidirectional single fibre linked system. FIG. 4 illustrates an arrangement in which bidirectional links are used, with each terminal receiving from and transmitting to both links with the adjoining terminals. In this case both the incoming and outgoing couplings 41 and 43 are coupled to a common short coupling piece 45 which is in turn coupled to the receiver 10 and the transmitter 33 by separate further couplings 46 and 47 respectively, so that light received from either direction is coupled to the receiver and light from the transmitter is propagated in both directions. The same remarks about the function of the bypass apply in this case as in the previous case.

Figure 5:
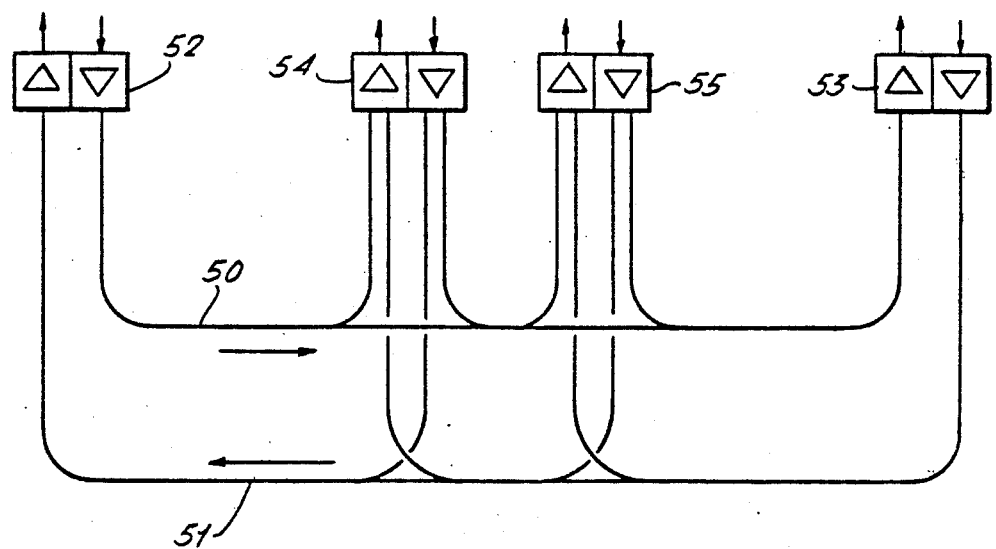
FIG. 5 is a block diagram of a third form of data transmission system providing bi-directional transmission utilising uni-directional optical fibre links.

FIG. 5 illustrates a dual fibre link system in which two unidirectional highways 50, 51 link two main terminals 52, 53 and intermediate terminals 54, 55 are coupled into the highways. Each intermediate terminal receives from and transmits to both highways. In this case, as in all the other arrangements, synchronisation of the terminal's transmission burst periods is required. The detailed coupling arrangement for the intermediate terminals are illustrated in FIG. 6. Incoming link 50a of highway 50 feeds coupling 56 and bypass 57, whilst incoming link 51b of highway 51 of highway feeds coupling 58 and bypass 59. Couplings 56 and 58 are in turn coupled to receiver 10 by a common short coupling 60. Transmitter 33 feeds, via a common short coupling 61, couplings 62, 63 which in turn feed the outgoing links 50b and 51a.

The principles of the invention can be applied also to hybrid systems in whch, for example, two ring main systems are linked by a short common link so that optical power in each ring is coupled into the other ring.

The problem of delay difference between the signal leaked through the tee-piece and that regenerated at the terminal could result in unacceptable intersymbol interference. This could be overcome either by adding optical delay in the onward path of the tee-piece, or by increasing the forward loss on the tee-piece to the extent where intersymbol interference is acceptable. For example, with the 20 dB loss in the forward direction, −3 dB take-off, and 5 dB section loss, the normal loss between terminals would be 11 dB. With one terminal out of action, the loss would be 36 dB. The delayed pulses, at 20 dB below signal level, would be acceptable. This example shows that one terminal failure could easily be accommodated, although it may be difficult to design a system to accommodate two adjacent failures.

We claim:
1. A data transmission system, comprising:
a plurality of data terminals each having a receiving means and a transmitting means for respectively receiving data signals and transmitting data signals;
a plurality of optical fiber links each connecting the transmitting means of a data terminal to the receiving means of the next succeeding data terminal in the system;
each data terminal including means for coupling a portion of the optical power in the optical fiber link connected to the receiving means to the optical fiber link connected to the transmitting means;
means associated with each data terminal for storing data for transmission from said terminal; and
means for transmitting the data so stored during a predetermined transmission period.

2. A system according to claim 1 wherein a repeating terminal includes means for coupling the electrical output of the receiving means to the electrical input to the transmitting means at all times except during that terminals allotted transmission period.

3. A system according to claim 1 wherein each terminal transmits at the commencement of its allotted transmission period a unique signal, and each terminal includes in its receiving means an automatic gain control circuit and timing means coupled to the gain control circuit whereby the gain control circuit responds to the unique signal to set the gain of the receiving means during reception of the unique signal only, the gain being then clamped for the remainder of each transmission period following the unique signal.

4. A system according to claim 3 wherein each terminal transmits an address code signal identifying that terminal and an address code signal identifying the terminal for which it is transmitting data following the unique gain control signal and before the data stored for transmission, and each terminal includes means for storing a preset address code identifying that terminal, means for comparing the received address codes with the stored preset address code, storage means for storing data received by the receiving means, said data storing means being inhibited from storing received data except during transmission periods which begin with an address code matching the stored preset address code.

5. A system according to claim 4 wherein each terminal includes means for storing preset address codes for all the other terminals, means for comparing the received address codes with the stored preset address codes for the other terminals, and clock frequency generating means, the output of the received address code comparing means being applied as a synchronising signal to the clock generating means.

6. A data transmission system, comprising:
first and second unidirectional optical fiber links adapted to transmit optical data in first and second opposite directions respectively;
a data terminal connected into both said first and second optical fiber links and having receiving and transmitting means for respectively receiving data signals from, and transmitting data signals to, said first and second optical fiber links;
means for connecting the receiving means of said data terminal to both the first and second optical fiber links for receiving data signals in a first direction from said first optical fiber link and for receiving data signals in a second direction from said second optical fiber link;
means for connecting the transmitting means of said data terminal to both the first and second optical fiber links for transmitting data signals in both said first and second directions along said first and second optical fiber links;
means for bypassing a portion of the optical power in the first optical fiber link in the first direction around the data terminal; and means for bypassing a portion of the optical power in the second optical fiber link in the second direction around the data terminal.

7. A data transmission system, comprising:

a plurality of data terminals each having a receiving means and a transmitting means for respectively receiving data signals from, and transmitting data signals to, optical fiber links, each optical fiber link connecting the transmitting means of a given data terminal to the receiving means of the next data terminal in the system, each data terminal including means for coupling a portion of the optical power in the optical fiber link connected to the receiving means to the optical fiber link connected to the transmitting means, the transmitting means of a portion of the data terminals being coupled by separate unidirectional optical fiber links to the receiving means of both the next preceeding and the next succeeding terminals and the receiving means of said portion of data terminals being connected by separate unidirectional optical fiber links to the transmitting means of both the next succeeding and next preceding terminals, the incoming optical fiber link from the next preceding terminal and the outgoing optical fiber link to the next succeeding terminal being optically coupled by a length of optical fiber to provide a bypass of the terminal for some of the optical power in said incoming link and the incoming optical fiber link from the next succeeding terminal and the outgoing optical fiber link to the next preceding terminal being optically coupled by a length of optical fiber to provide a bypass of the terminal for some of the optical power in the incoming link.

8. A data transmission system, comprising:

a plurality of data terminals each having a receiving means and a transmitting means for respectively receiving data signals and transmitting data signals;

a plurality of optical fiber links each connecting the transmitting means of a data terminal to the receiving means of the next succeeding data terminal in the system;

a length of optical fiber associated with each data terminal for optically coupling the optical fiber link connected to the receiving means and the optical fiber link connected to the transmitting means, the length of optical fiber providing a bypass of the terminal for a portion of the optical power provided by the optical fiber link connected to the receiving means, wherein a portion of the data terminals act as on-line repeaters, the portion of the optical power that bypasses each of said repeating terminals being a minor portion of the total power receiving at the receiving means and all other terminals act as non-repeating terminals and the portion of the optical power that bypasses the non-repeating terminals being a major portion of the total power received at the receiving means of the terminal.

* * * * *